(12) United States Patent
Gimbler et al.

(10) Patent No.: US 11,922,833 B2
(45) Date of Patent: Mar. 5, 2024

(54) SYSTEM AND METHOD FOR MOUNTING OF A POLYGONAL DISPLAY WALL

(71) Applicant: BARCO N.V., Kortrijk (BE)

(72) Inventors: Georg Josef Gimbler, Ettlingen (DE); Roland Michael Schmuker, Karlsruhe (DE); Tom Adriaan Gerard Dewaele, Antwerp (BE)

(73) Assignee: BARCO N.V., Kortrijk (BE)

( * ) Notice: Subject to any disclaimer, the term of this patent is extended or adjusted under 35 U.S.C. 154(b) by 297 days.

(21) Appl. No.: 17/427,938

(22) PCT Filed: Feb. 6, 2020

(86) PCT No.: PCT/EP2020/053022
§ 371 (c)(1),
(2) Date: Aug. 3, 2021

(87) PCT Pub. No.: WO2020/161258
PCT Pub. Date: Aug. 13, 2020

(65) Prior Publication Data
US 2022/0093016 A1 Mar. 24, 2022

(30) Foreign Application Priority Data
Feb. 7, 2019 (GB) ..................... 1901729

(51) Int. Cl.
*G09G 5/00* (2006.01)
*F16M 11/04* (2006.01)
(Continued)

(52) U.S. Cl.
CPC ......... *G09F 9/3026* (2013.01); *F16M 11/045* (2013.01); *F16M 11/126* (2013.01); *F16M 2200/022* (2013.01)

(58) Field of Classification Search
CPC ............... G06F 1/1641; G06F 3/1446; G09G 2300/023; G09G 2300/026; F16M 11/126;
(Continued)

(56) References Cited

U.S. PATENT DOCUMENTS 8,007,121 B2 * 8/2011 Elliott ....................... G09F 9/33
362/147
9,903,567 B2 * 2/2018 Lan ....................... G09F 9/3026
(Continued)

FOREIGN PATENT DOCUMENTS

| | | |
|---|---|---|
| CN | 109036161 A | 12/2018 |
| EP | 3059725 A1 | 8/2016 |
| WO | 2013192614 A2 | 12/2013 |

OTHER PUBLICATIONS

International Search Report and Written Opinion issued in PCT/EP2020/053022, dated Apr. 6, 2020, 12 pages.

*Primary Examiner* — Joe H Cheng
(74) *Attorney, Agent, or Firm* — HAMRE, SCHUMANN, MUELLER & LARSON, P.C.

(57) ABSTRACT

There is provided an interface system for joining display modules to a framework structure. The interface system comprises a base structure and a holder structure, the holder structure can be attached to the framework, and the base structure can be attached to two or more of the display modules. The holder structure or the base structure are interfaced by a tiltable planar surface and a curved support structure so that the holder structure and base structre are moveable towards each other. A multiple of base structures can be joined via elongated members.

14 Claims, 12 Drawing Sheets

(51) Int. Cl.
*F16M 11/12* (2006.01)
*G09F 9/302* (2006.01)

(58) Field of Classification Search
CPC ..... F16M 2200/022; G09F 9/30; G09F 9/301; G09F 9/3023; G09F 9/3026
See application file for complete search history.

(56) References Cited

U.S. PATENT DOCUMENTS

| | | | |
|---|---|---|---|
| 10,885,815 B1* | 1/2021 | Svidler | F16M 11/045 |
| 2009/0309819 A1* | 12/2009 | Elliott | G09F 9/3026 |
| | | | 345/82 |
| 2013/0265765 A1* | 10/2013 | Liang | H05K 5/0208 |
| | | | 362/249.02 |
| 2014/0247612 A1* | 9/2014 | Hochman | F16M 13/02 |
| | | | 362/427 |
| 2022/0022330 A1* | 1/2022 | Dewaele | F16M 11/18 |

* cited by examiner

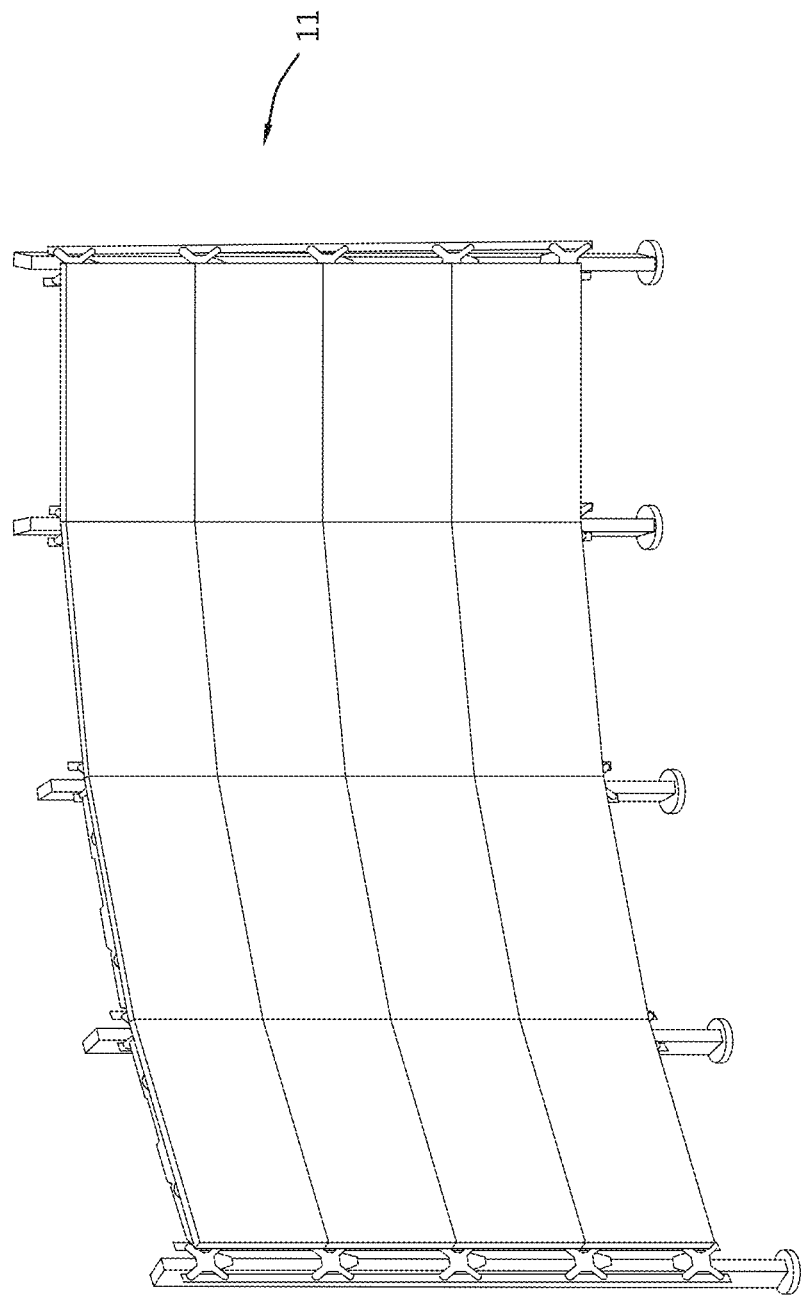
Fig. 1A
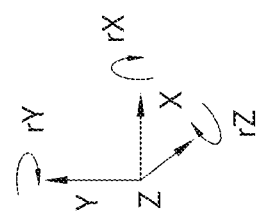

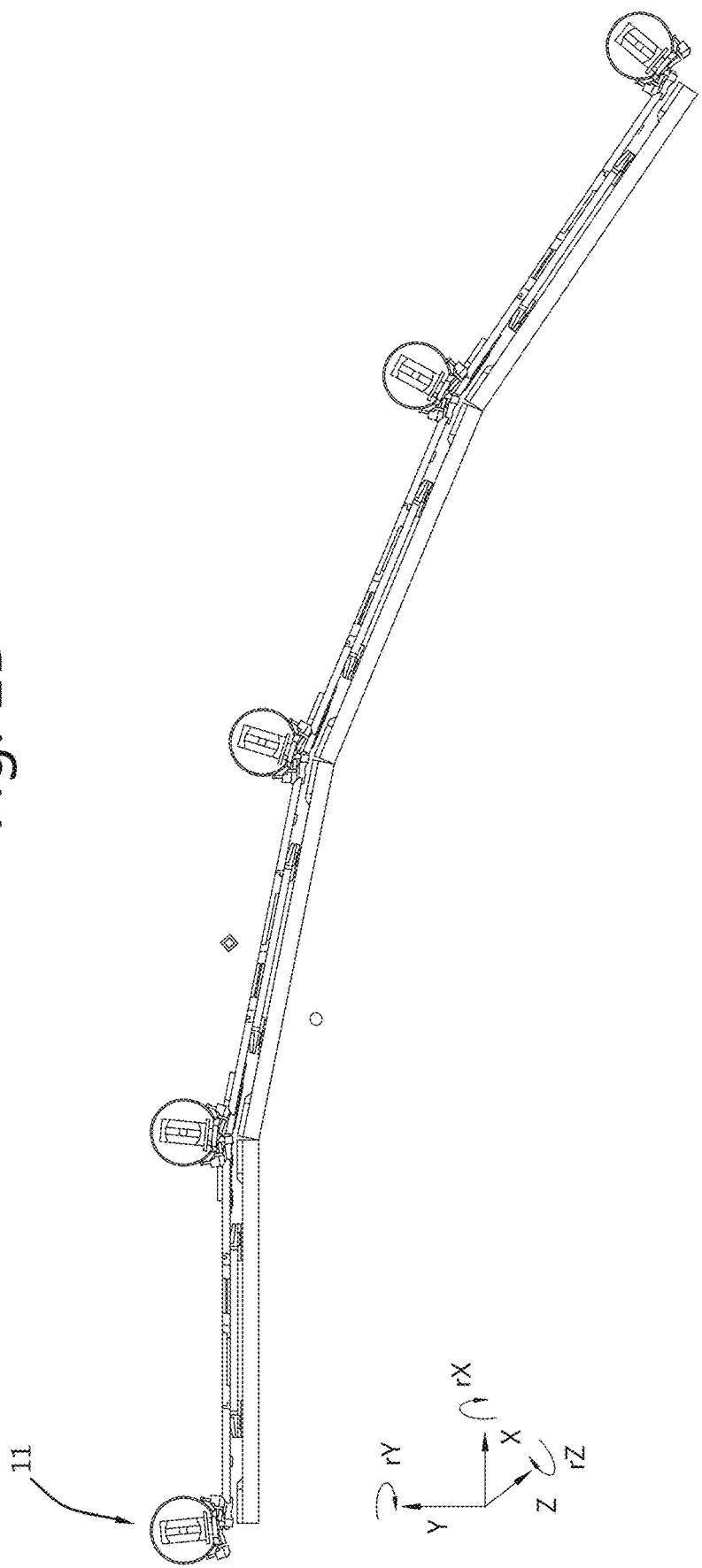

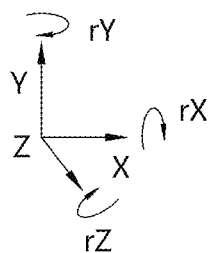
Fig. 4A
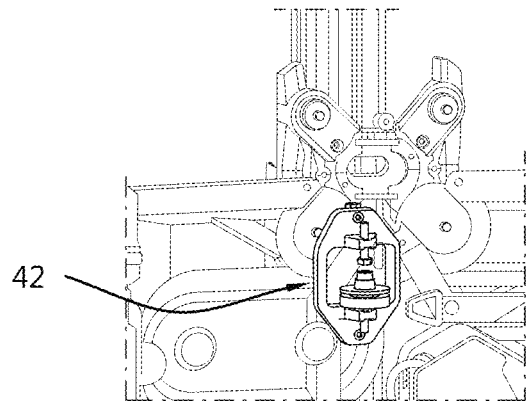
Fig. 4B
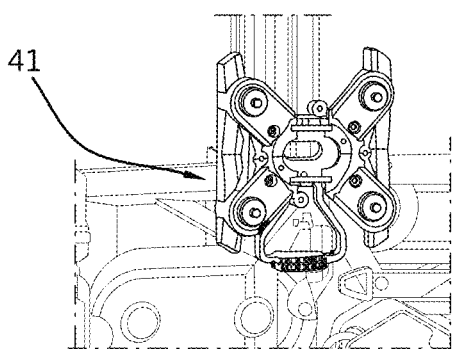
Fig. 5
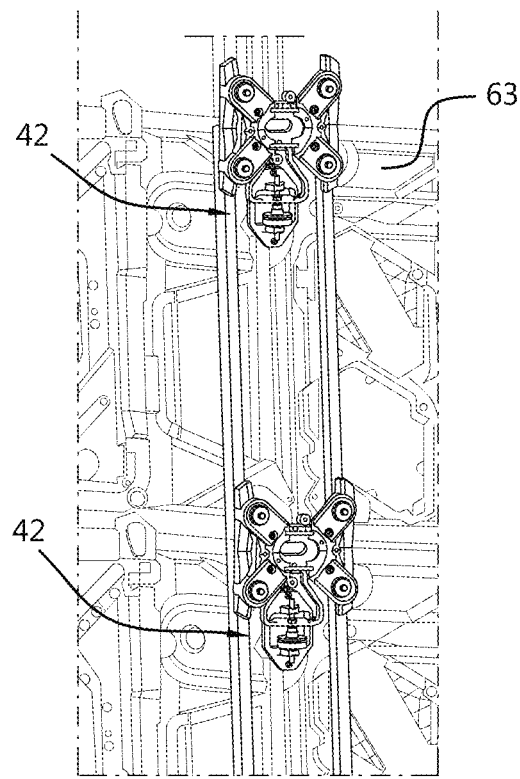

Fig. 6
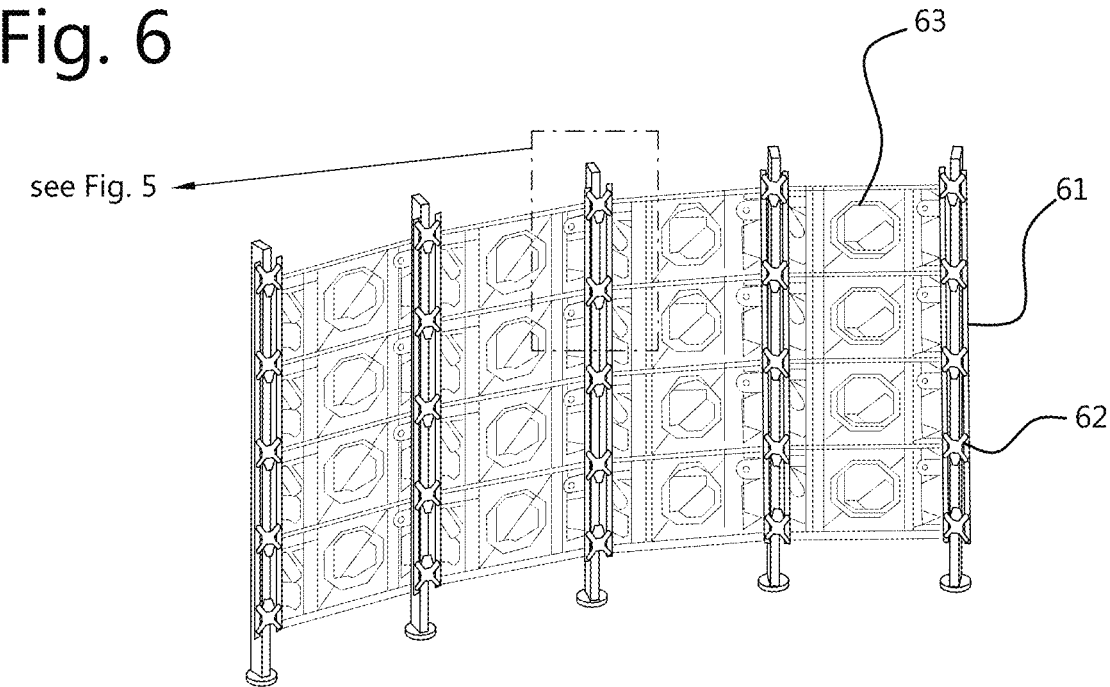
Fig. 7A
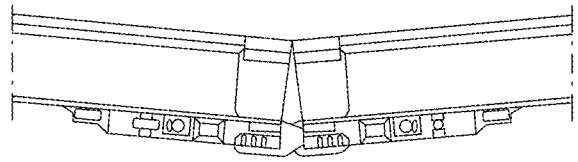
Fig. 7B
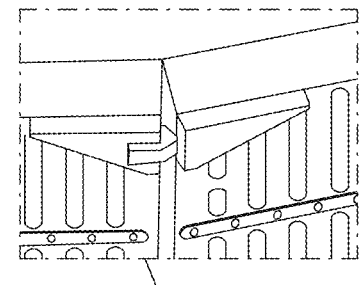
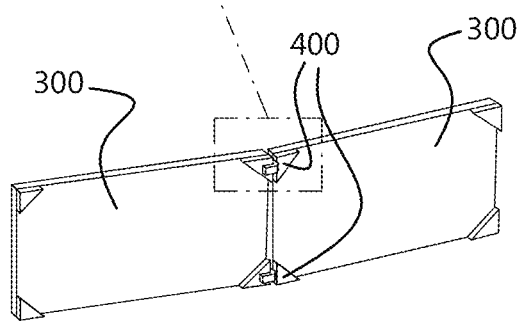

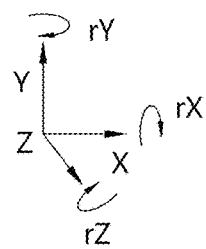
Fig. 8A
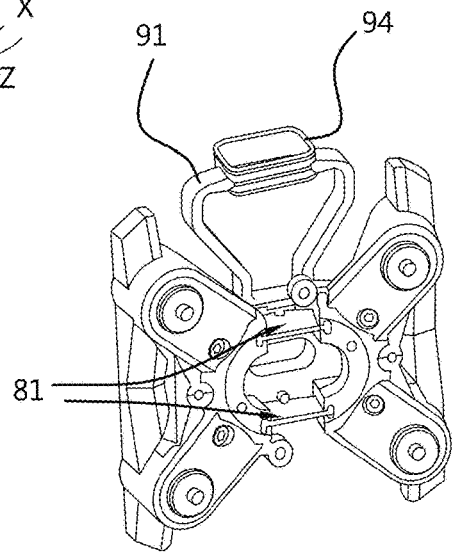
Fig. 8B
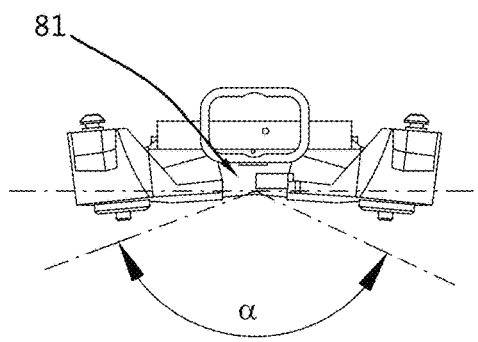
Fig. 9A
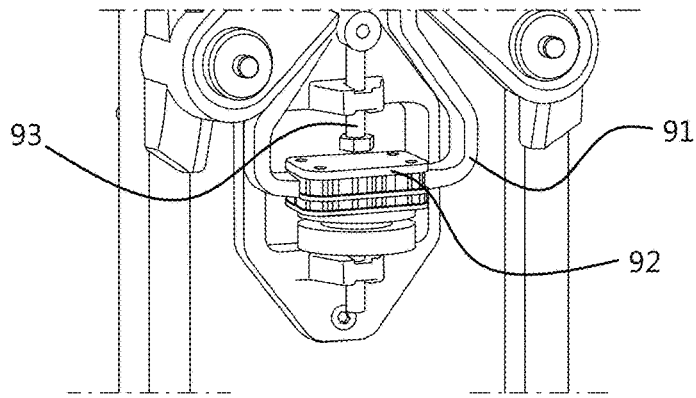
Fig. 9B
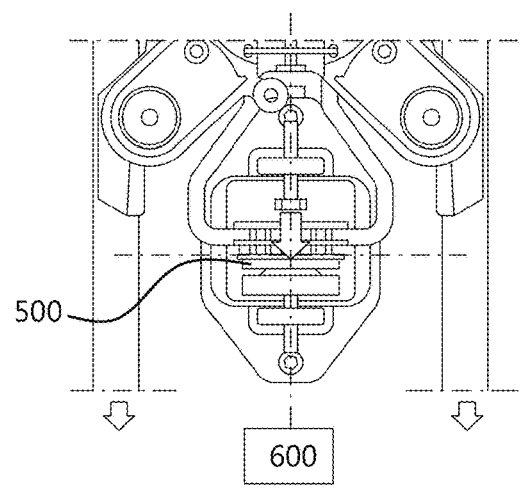

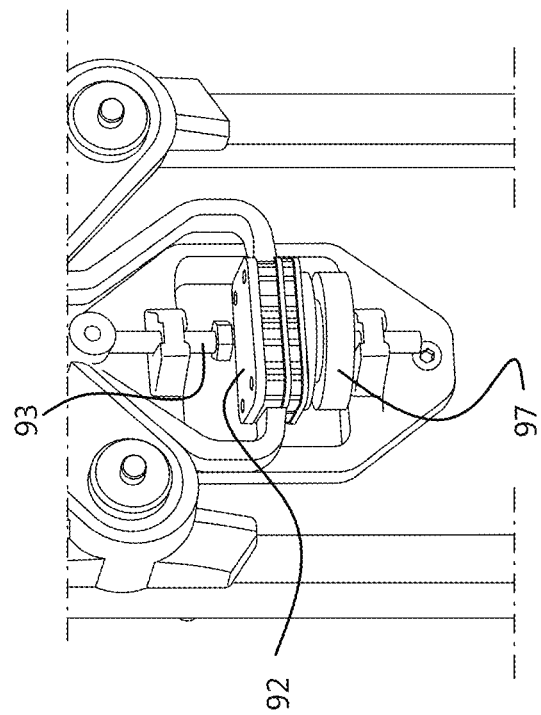
Fig. 12
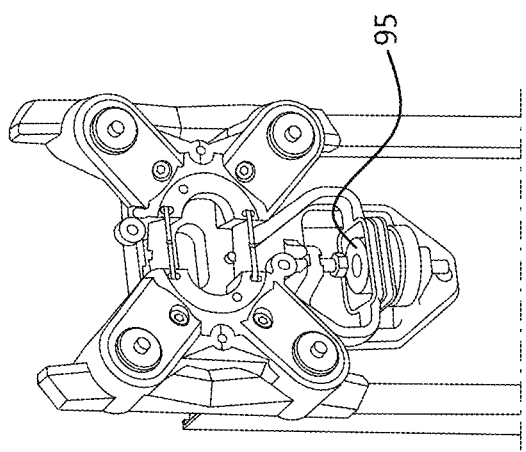
Fig. 11
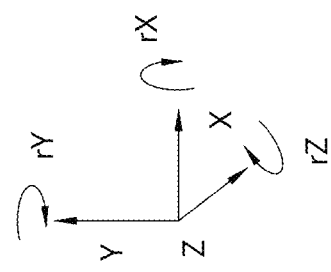

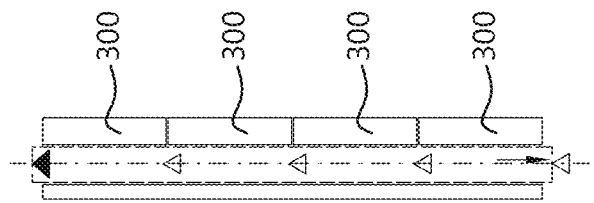
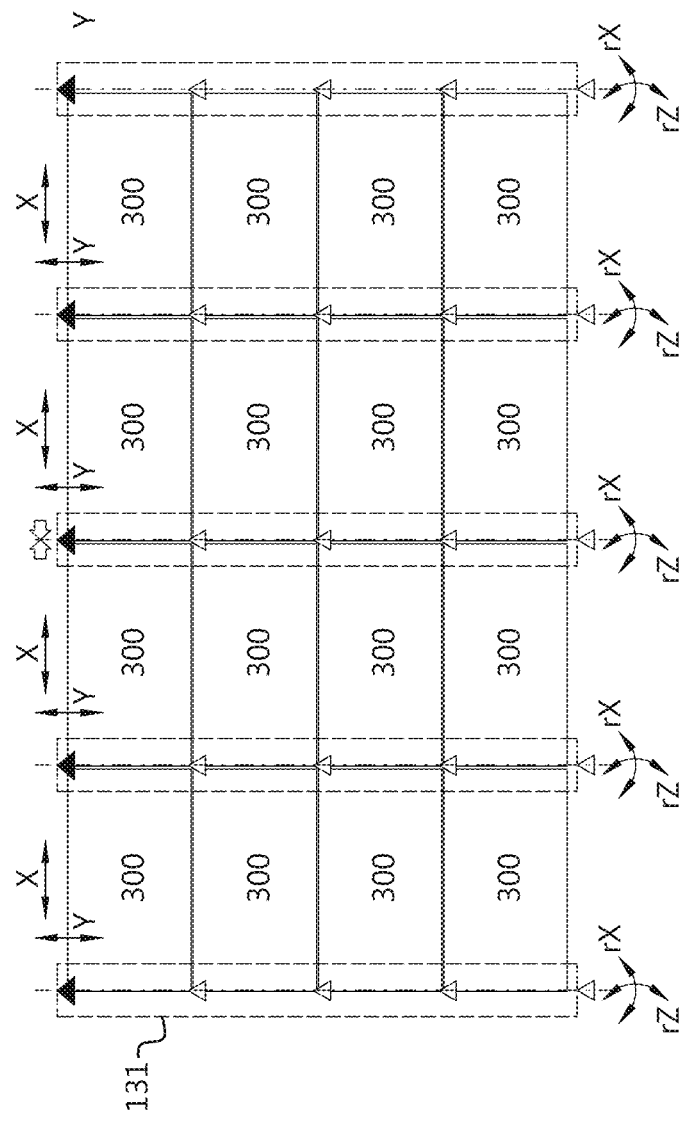
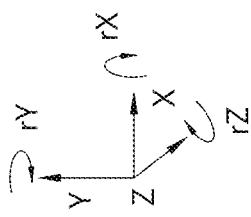

Fig. 14A
Fig. 14B
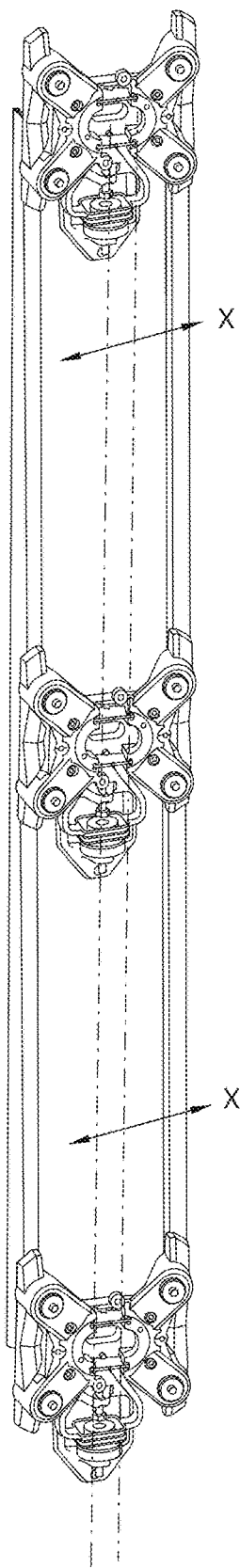
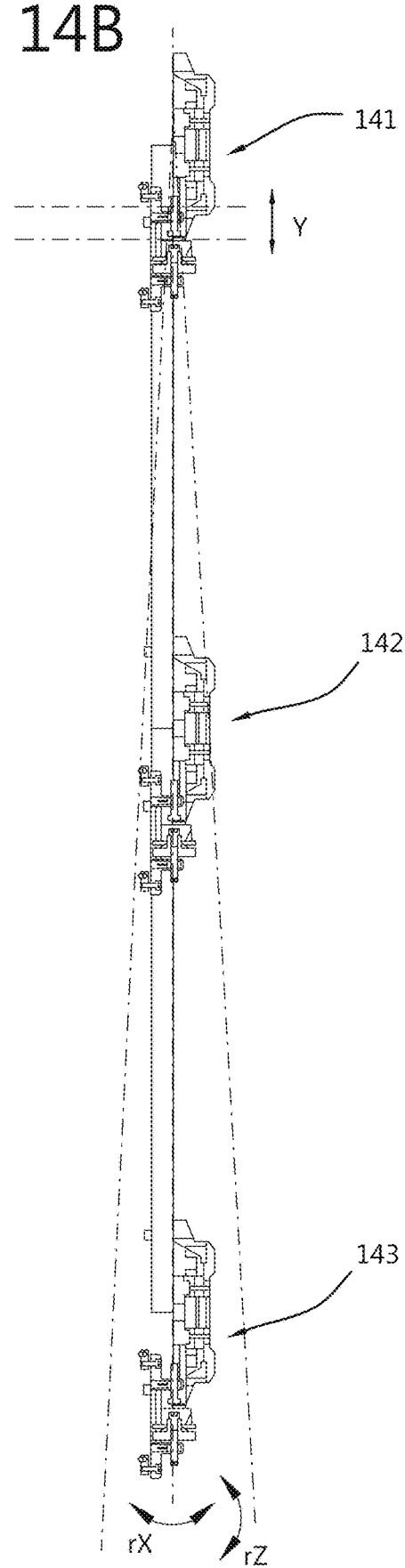

SYSTEM AND METHOD FOR MOUNTING OF A POLYGONAL DISPLAY WALL

This application is a national stage of PCT/EP2020/053022, filed on Feb. 6, 2020, and claims priority to United Kingdom Application No. GB1901729.2, filed on Feb. 7, 2019, the content of which in its entirety is herein incorporated by reference.

BACKGROUND

Large images can be displayed on "display walls" where several electronic display modules are tiled in a matrix and the images are distributed of the display wall. It is desirable to decrease the visible gap between each individual display module originating e.g. from the display module bezels. This can be obtained by mechanical structures where each module is adjusted into a correct position. It can further be desirable to provide a display wall that is not bound to extend in one plane but can be folded along a curvature. This can e.g. increase the immersive experience for the viewer. The non-planar configuration can however lead to increased amount of induced stress in both the mechanical structure and the display modules themselves.

SUMMARY OF THE INVENTION

It is an objective of the present invention to provide a display wall that can be folded along a curvature, comprising means for stress release in the supporting structure or the display modules.

In one embodiment of the present invention there is provided an interface system for joining at least two to four display modules to a framework structure comprising a base structure and a holder structure, the holder structure can be attached to the framework, and two to four corners of the base structure are arranged so that they can each be attached to one of the display modules, the holder structure or the base structure can be interfaced by a tiltable planar surface and a curved support structure so that the tiltable planar surface can rest on the curved support structure, the holder and base can be movable relative each other to adopt a tilting angle of the tiltable planar surface and/or to adopt a linear displacement along the tiltable planar surface.

Additionally or alternatively, the tiltable planar surface can be supported by a threaded turning wheel that can displace the tiltable planar surface along an axis perpendicular to the rotation plane of the threaded turning wheel.

This has the advantage of enabling a time efficient adjustment of the position and orientation of the display modules relative to the supporting framework.

Additionally or alternatively, the base structure can be folded into an angle along an axis between the fixation of the display modules. Additionally, the base structure can comprise a spacer to support the angle.

This has the advantage of enabling the display modules to be arranged with an angle toward each other and further to create a curved display wall, e.g. a two-dimensional curve.

Additionally or alternatively, the system can comprise a fixation system for fixing the base structure and holder structure in a desired position relative each other.

This has the advantage of enabling a final stable configuration of the display wall with reduced amount of stress.

Additionally or alternatively, the base structures can be mounted onto elongated members that joins the base structures.

This can facilitate the adjustment of the display modules in a display wall by transferring the changes in position of a display module to the other display modules connected to the same elongated members.

Additionally or alternatively, the interface system can comprise means for blocking relative displacement along the tiltable planar surface.

This enables the creation of an aligned reference point in the display wall for the adjustment of the other holder/base pairs.

In another embodiment of the present invention there is provided a display wall comprising an interface system according to the above, wherein the gap between the display modules can comprise an angle adapter 400.

In another embodiment of the present invention there is provided a method for interfacing two to four display modules to a framework structure comprising a base and a holder, the holder can be attached to the framework and two to four corners of the base are arranged so that they can each be attached to one of the display modules, the holder or the base can be interfaced by a tiltable planar surface and a curved support structure so that the tiltable planar surface cab rest on the curved support structure, the method can comprise moving the holder and base relative to each other by tilting the tiltable planar surface and/or by displacing them along the tiltable planar surface.

Additionally or alternatively, the tiltable planar surface can be supported by a threaded turning wheel, the method comprising displacing the tiltable planar surface in along an axis perpendicular to the rotation plane of the threaded turning wheel by turning the wheel.

This has the advantage of enabling a time efficient adjustment of the position and orientation of the display modules relative to the supporting framework.

Additionally or alternatively, the base structure can comprise an axis between the fixation of the display modules, and the method cab comprise configuring the base structure to be folded into an angle along said axis.

Additionally or alternatively, the method can comprise inserting a spacer into the folded base structure to support the angle.

This has the advantage of enabling the display modules to be arranged with an angle toward each other and further to create a curved display wall.

Additionally or alternatively, there can be provided a fixation system and the method can comprise having the fixation system fixing the base structure and holder structure in a desired position relative each other.

This has the advantage of enabling a final stable configuration of the display wall with reduced amount of stress.

Additionally or alternatively, the method can comprise mounting the base structures onto elongated members that joins the base structures.

This can facilitate the adjustment of the display modules in a display wall by transferring the changes in position of a display module to the other display modules connected to the same elongated members.

Additionally or alternatively, the method can comprise inserting means for blocking relative displacement along the tiltable planar surface into the interface system.

This enables the creation of an aligned reference point in the display wall.

BRIEF DESCRIPTION OF DRAWINGS

FIGS. 1A and 1B show an embodiment of the present invention comprising display modules arranged in a display wall, supported by pillars.

FIGS. 3A, 3B, 3C and 3D show different views of an embodiment of the present invention comprising a display wall having bases. FIG. 3D shows FIG. 3 of the British patent application GB1901729.2 from which the present patent application claims priority.

FIG. 4 shows an embodiment of the present invention comprising a holder and a base.

FIG. 5 shows an embodiment of the present invention comprising a two holder/base pairs embedded in a meta structure.

FIG. 6 shows an embodiment of the present invention comprising a display wall having main assemblies.

FIG. 7 shows an embodiment of the present invention comprising an angle adapter.

FIG. 8 shows side- and top view of an embodiment of the present invention comprising a base having a spacer.

FIG. 11 shows an embodiment of the present invention comprising a holder/base pair and a nominalizer.

FIG. 12 shows an embodiment of the present invention comprising a holder/base pair and a fixation plate.

FIGS. 13A and 13B show an embodiment of the present invention comprising a display wall having a nominalizer.

FIGS. 14a) and 14b) show an embodiment of the present invention comprising a meta structure.

DEFINITIONS

Figure 2:
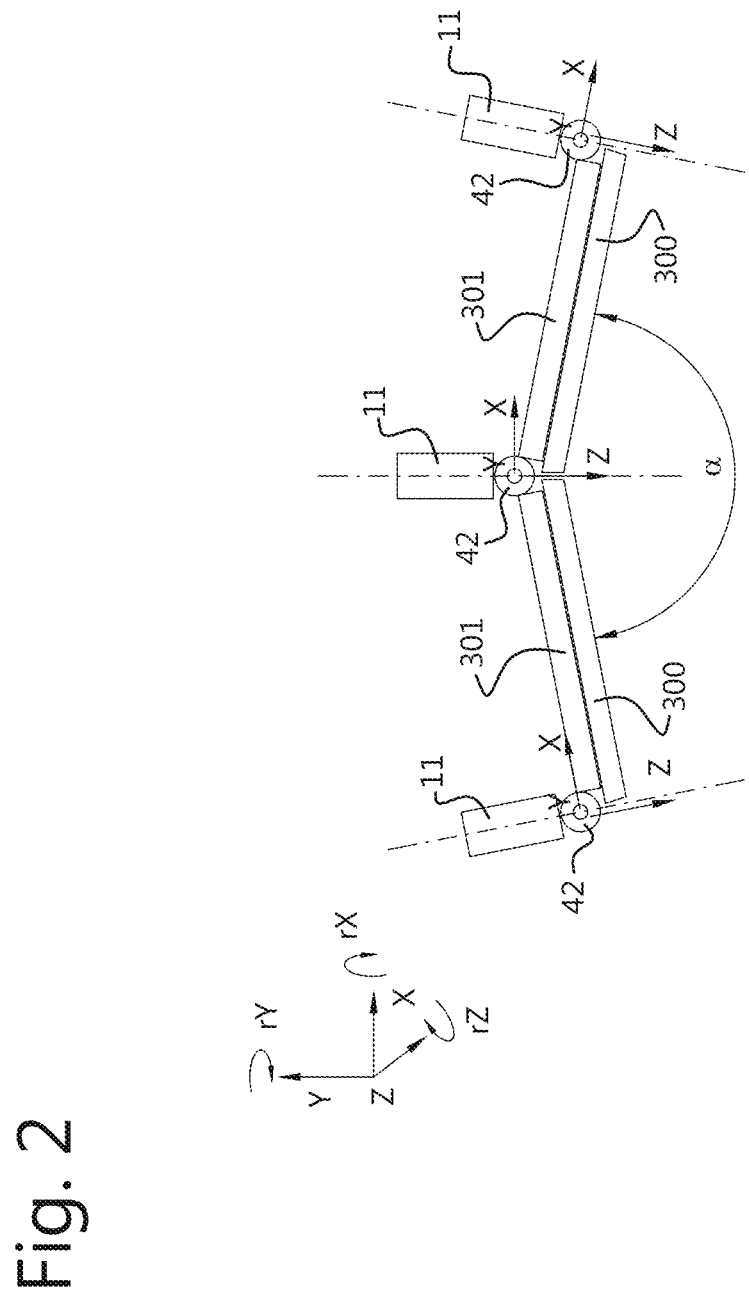
FIG. 2 shows a top view of an embodiment of the present invention comprising a display wall section where two display modules are folded to each other with an angle alpha.

A "display module" can be an electronic display screen where the driving electronics is located separately from the display screen itself. This can be seen in implementations of display walls, where multiple of display screens are mounted in a matrix layout to create one large wall of displays. By placing the electronics separately, it is possible to save weight and space of the display wall. The individual display screens can be implemented with various technologies, such as LCD, LED, OLED, Plasma, or CRT, etc.

A "display wall" can comprise a multiple of display modules arranged next to each other in a matrix so that they together can display one image. The display modules in the display wall can be arranged in the same plane or in different planes. The individual display modules may be planar or curved.

If a display wall is extending primarily perpendicularly to the ground, a "display module column" can be a row of display modules placed on top of each other.

A "pillar" can be any supporting structure that the display modules and possible interfacing devices can be mounted on. The pillars can be stand-alone on the floor or they can be wall mounted. At least two pillars can support one display module.

A display module can be attached to a pillar via a system comprising a "base" or a "base structure" and a "holder" or a "holder structure". The holder is attached to the pillar and the base is attached to the display module, and the base and the holder can be configured to connect to each other so that the position of the base (with display module) can be adjusted in the x, y and z directions. This can be obtained by providing the holder/base system with a planar structure which is tiltable on top of a curved support structure. For example, the planar tiltable structure can be a disk or washer and the curved support structure can be a ball disk or washer. The planar tiltable structure and the curved support structure can be placed either on the base or on the holder. If for example, the holder comprises the tiltable planar structure and curved support structure, the base can rest onto the tiltable planar surface so that the display module can be moved into a desired position. The holder/base system can further comprise means for fixation so that when the holder/base system has adopted a desired position, it can be fixated in one or more degrees of freedom.

Further, the base structure can be configured to fold along one of its center axes with an angle. A spacer can be inserted into the base structure to lock it into the folded position. When two display modules are mounted onto each side of the base structure, their viewing areas will have an angle towards each other. A multiple of such display module pairs can be installed next to each other and/or on top of each other to create a curved display wall. In such installation the above described holder/base pair can provide freedom to move in the x, y and z direction. In this way it is possible to avoid and release stress in the structure and in the display modules.

In a display wall, each display module can be attached to four bases, e.g. each corner of the display can be attached to one base. Further, a base can be attached to two or four displays, if the displays are located at the edges of the display wall or interior of it, respectively.

The bases can further be attached with precise intervals onto elongated members to form a "meta structure". Each meta structure can then be attached to a pillar to form a "framework structure" which will carry the display wall.

When adjusting a display module in a display wall that is implemented with meta structures, the change of position or orientation of the display can be transferred to its neighbouring displays (in the same meta structure) and hereby preserve most of the alignment between all connected displays. Hence, the meta structure can facilitate the manipulation of the display wall. For example, the meta structure can be rotated around the horizontal- (or x) axis by displacing one end of it e.g. with a spacer or screw.

Each display module can additionally be mounted onto a "display mount" (structure) 301 which can provide a connection between the display modules in the horizontal (or x-axis) direction.

DETAILED DESCRIPTION

FIGS. 1A and 1B show a side- and top view, respectively, of an embodiment of the present invention comprising a curved display wall extending perpendicularly to a reference surface, e.g. the ground. The display wall contains displays or display modules 300. Display modules can (individually) be mounted between supporting pillars 11 in vertical "module columns". Each module column can be angled towards each other in order to create a curved display wall. When describing the present invention, the x,y,z directions are defined for each attachment point of a display module. The y direction would extend along a pillar, the x direction perpendicular to y and in the plane of a display module, and the z direction out of the display plane, e.g. towards the viewing side of the display module.

FIG. 2 shows a schematic top-view of an embodiment of the present invention where two display modules (or display module columns) are mounted in an angle alpha (α) to each other. Alpha can be 180 degrees or lower. In a typical embodiment alpha can be between 179 to 170 degrees, but lower angles are also possible, such as from 180 degrees to 90 degrees. It is also possible to have a different angle alpha (α) for different pairs of display modules.

Figure 3C:
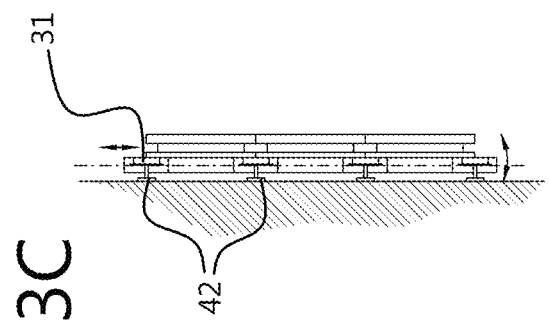
Figure 3A:
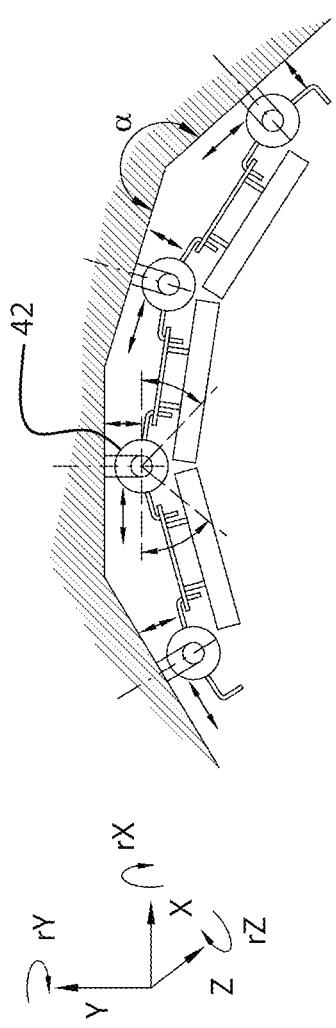
Figure 3B:
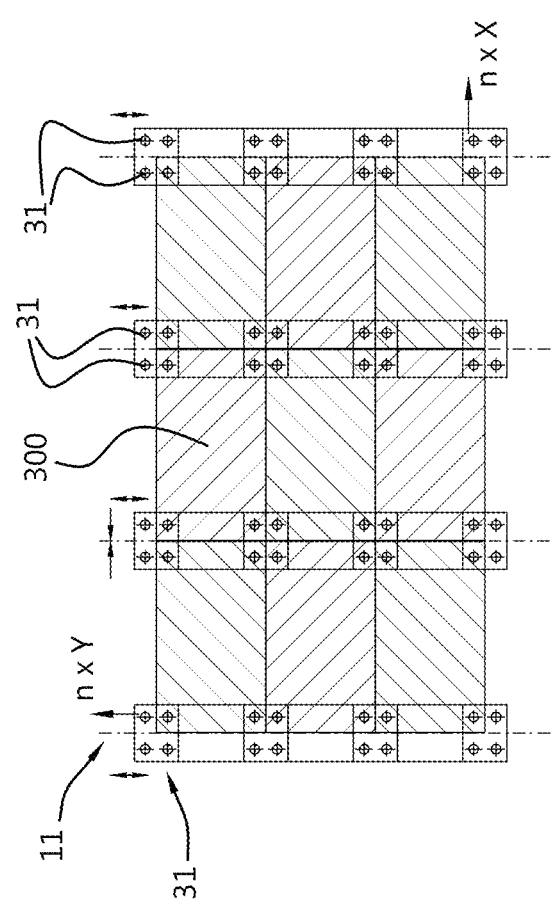

FIGS. 3A, 3B and 3C show respectively a top-, front- and side view of an embodiment of the present invention comprising a pillar 11 with a display mount interface 31. FIG. 3D shows the same embodiment. FIG. 3A shows an angle oriented carrying system. The full display wall can be supported by a multiple of pillars like 11 and display mount interfaces like 31. The front view shows how each display module can be attached to four bases, for example with one attachment point in each base.

FIG. 4 shows an embodiment of the present invention comprising a base 41 which forms a single interface to a display mount and which is placed adjacent to a "holder" 42 which is fixed to a pillar 11 and which holder forms an interface to pillar 11. Each base is placed adjacent to a holder 42, as shown for the two base-holder pairs in FIG. 5. FIG. 5 shows a display mount structure 63 (see also FIG. 6) and a main assembly: connection of all bases between the display columns. The holders on the same pillar can be connected in a "meta structure" as shown in FIGS. 5 and 6. Thus, the holders are the interfaces between the meta structure (with the bases which holds the display modules) and the pillars.

FIG. 6 shows the meta structures 61 with bases 62 and a display mount structure 63. As illustrated in FIG. 6, at least six bases 62 (and corresponding adjacent holders) are provided for joining at least two display modules, in which the bases 62 (and corresponding adjacent holders) are provided at the corners of the two display modules. The display modules can thus be attached to the display mount structure and the meta structures. However, the present invention can be implemented with other display mount systems than those in FIG. 3 or FIG. 6.

FIG. 7 shows another embodiment of the present invention comprising "angle adapters" 400 placed on the backside and between the display modules in order to preserve the correct angle.

FIG. 8 shows a close up of a front- and top-view of a base. The spacers 81 can be designed to support the base folded to the angle alpha.

Figure 9C:
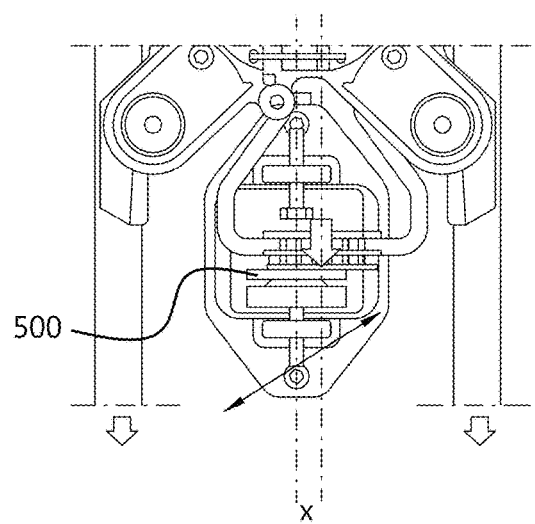
FIGS. 9a) to c) show an embodiment of the present invention comprising a holder having a tilting disk and a ball disk.
Figure 10A:
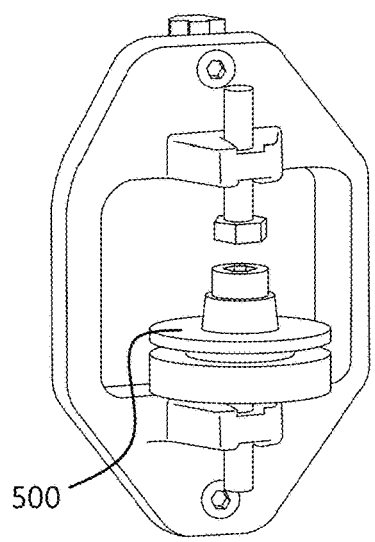
FIGS. 10A, 10B and 10C shows a front-, side- and top view of an embodiment of the present invention comprising a holder having a tilting disk and a ball disk.
Figure 10B:
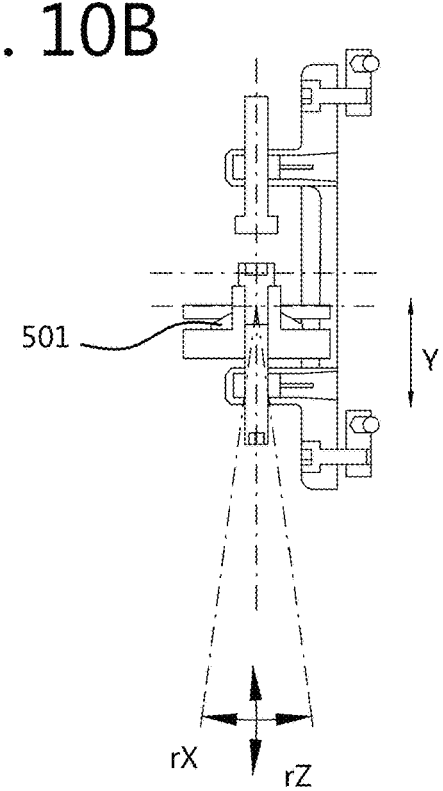
Figure 10C:
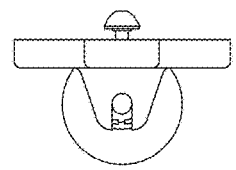

The outmost part of the base can comprise a bow shaped structure referred to as a "base bow" 91. The base bow can interface, for example via the interface surface 94, with the holder 42, as shown in FIG. 9a) to c). The holder 42 can comprise a planar tiltable surface, e.g. a tiltable disk 500, as shown in FIGS. 10A, 10B and 10C. The tiltable disk 500 rests on a curved support structure, e.g. a ball disk 501, so that the tiltable disk can tilt around the ball disk 501 and hence rotate around the x-axis and/or the z-axis. FIG. 9a) shows how the base bow 91 positioned adjacent to the holder and on top of the tiltable disk. FIG. 9b) shows how gravity (gravity load 600) can push the base bow 91 to get in contact with the tiltable disk 500. FIG. 9c) shows how the base bow can slide or move along the x-axis when in contact with the tiltable disk. The tiltable disk can rest onto a support that can be displaced along the y-direction e.g. by means for displacement, e.g. a threaded wheel 97 that can be manually turned. The wheel side can have a knurled surface for improved grip, see e.g. FIG. 12. The threaded wheel can, for example, be a knurled screw. Thus, the above described holders makes it possible to finetune the position of each display module within the display wall so that a stress-free configuration can be obtained.

A fixation plate 92 can be attached to the base bow, and when the base has adopted a desired position, a clamping screw 93 can be elongated (e.g. manually with a wrench) so that it pushes on the fixation plate 92. The force of turning the screw is higher than the force a display could assert onto the holder/base system, hence when the fixation plate 92 is locked, the holder/base system is also locked in all directions (rotational or lateral). The curved support structure (or ball disk) enables locking also when the planar tiltable surface (or tiltable disk) in oriented in a tilted position. The clamping screw 93 can be replaced with any structure or means that can lock the fixation plate 92 in position.

FIG. 11 shows another embodiment of the present invention where a "nominalizer" 95 is used to limit the linear movement of one holder/base pair. The nominalizer 95 can comprise a cylindrical structure (e.g. like a thick washer) and is preferably placed in a holder/base pair in- or adjacent to the middle position of the display wall, in the top row. The nominalizer can block the linear movement in X and Z direction, but the rotation around the x- and z axis can be allowed so that the base in contact with the tiltable disk can still tilt on the curved support during the adjustment of other holder/base pairs.

FIGS. 13A and 13B show a simplified view of an embodiment of the present invention comprising holder/base pairs (triangles) attached to elongated members, hence forming meta structures, for example 131. The meta structures are attached to pillars and display modules are mounted to the base structures. A good position for he nominalizer is indicated (by means of two thick arrows pointing at each other) at the top position of the central pillar. The centered position is defined with the normalizer. This can limit the accumulated errors due to margins since they will be divided in the two directions. At FIG. 13B the thick arrow pointing downwards represents the fixation in a simplified way. For example, this could be a clamping screw for fixing (i.e. to activate rZ and rX).

FIG. 14a) shows a front view of a meta structure comprising three holder/base pairs. FIG. 14b) shows a side view of the same meta structure. For example, if the holder/base pair 141 is tilted around the x axis ("rX") the meta structure can be displaced e.g. along the dotted lines so that an alignment between the holder/base pairs 141, 142 and 143 can be maintained. Consequently, this can also maintain an alignment between the display modules connected to the holder/base pair.

Figure 15B:
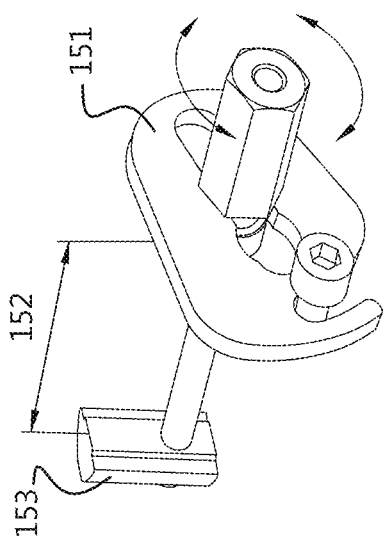
FIGS. 15a) and 15b) show an embodiment of the present invention comprising means for adjustment.
Figure 15A:
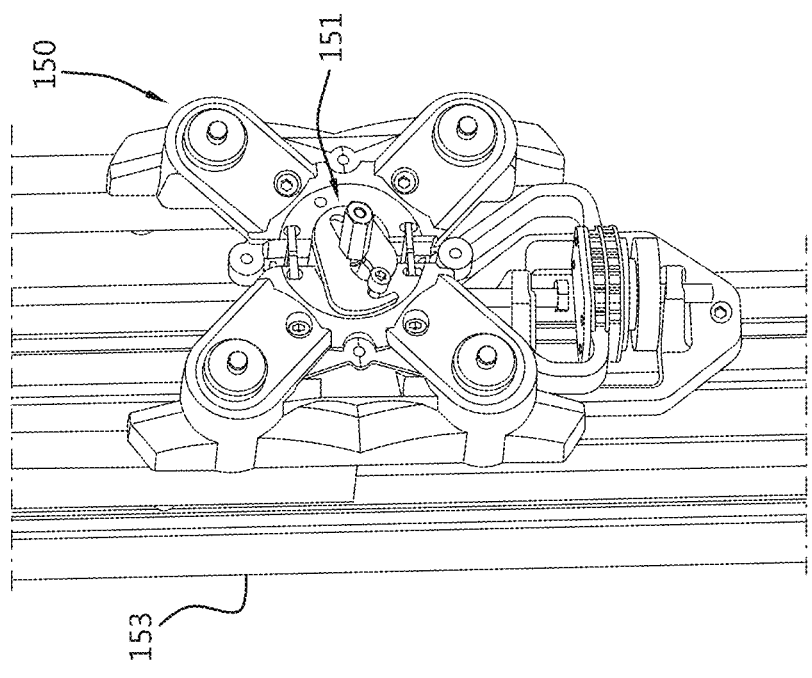

FIGS. 15a) and 15b) show an embodiment of the present invention comprising a holder/base pair 150 attached to a pillar 153 and having means for adjustment 151. The means for adjustment 151 comprises a screw and that can be elongated so that it can change the distance 152 between the holder/base pair 150 and the pillar 153. This can provide a rotation of the holder/base pair (or corresponding meta structure) around the x-axis, as illustrated in FIG. 14b).

Exemplary Embodiment

The following procedure can be used in order to set up a planar or curved display wall. For simplicity it is assumed that the planar tiltable structure is a tiltable disk and the curved support structure is a ball disk, as illustrated in FIGS. 9 and 12.

1. Install the base structures on the meta structures.

2. Optionally choose a folding angle of the base structures and fix the angles with e.g. spacers and install the main assemblies on floor or wall pillars.
3. Attach the display modules to the bases and to an arbitrary display mount structure.
4. Choose a holder/base pair, preferably in a top center position in a vertically (from ground) extended display wall, to be reference/nominalizer and bring it into a desired position.
5. Adjust all holder/base pairs on the top row so that their display is correctly aligned.
6. Adjust all the remaining holder/base pairs so that each display is correctly aligned.
7. Fix all holder/base pairs with the means for fixation.

disk and the tiltable planar surface is a tiltable disk, and they both reside in the holder. The position and orientation of a holder/base pair can then be fixed in the following way:

8. Adjust the base/display along the x axis by sliding the base bow along the tiltable disk.
9. Adjust the base/display along the y axis by turning the knurled screw.
10. Adjust the base/display around the x and/or z axis by supporting the base against the tiltable disk and tilt it around the curved support structure.
11. Fix the holder/base system in the desired position, for example by turning a clamping screw until it pushes onto the fixation plate by e.g. using a torque of ca 3-5 N.

The relative movement between the holder and base structures are the same if the curved support structure or the planar tiltable surface are arranged in another way (e.g. they both reside in the base structure).

For illustration, assume the curved support structure is a ball.

The invention claimed is:

1. An interface system for joining at least two display modules to a framework structure, the interface system comprising:
   at least six base structures and at least six holder structures,
   wherein the holder structures are attached to the framework structure,
   wherein each of the four corners of one of the at least two display modules is attached to a separate base structure,
   wherein each of the base structures is placed adjacent to a holder structure,
   wherein an outmost part of each of the base structures comprises a bow structure that interfaces with the adjacent holder structure,
   wherein each of the holder structures comprise a tiltable planar surface and a curved support structure so that the tiltable planar surface rests on the curved support structure,
   wherein the bow structure of each of the base structures is positioned on top of the tiltable planar surface of the adjacent holder structure so that the bow structure can translate along or rotate around a horizontal axis that is substantially in a plane of the base structure and/or a horizontal axis that is substantially out of the plane of the base structure,
   wherein the tiltable planar surface is supported by a threaded turning wheel that can displace the tiltable planar surface along an axis perpendicular to a rotation plane of the threaded turning wheel.

2. The system according to claim 1, wherein the base structure is folded into an angle along a vertical axis through its centre.

3. The system according to claim 2, wherein the folded base structure comprises a spacer to support the angle.

4. The system according to claim 1, comprising a fixation system for fixing the base structure and the adjacent holder structure in a desired position relative each other.

5. The system according to claim 1, wherein the base structures are mounted onto elongated members that join the base structures.

6. The system according to claim 1, wherein the interface system comprises means for blocking relative displacement along the tiltable planar surface.

7. A display wall comprising an interface system according to claim 1, wherein a gap between the display modules comprises an angle adapter.

8. A method for interfacing at least two display modules to a framework structure using an interface system according to claim 1, the method comprising:
   attaching the display modules to base structures;
   bringing a first base structure/holder structure pair into a desired position, said bringing into position comprising the steps of:
   adjusting the base structure along a horizontal axis that is substantially in a plane of the base structure by sliding the base structure along a tiltable planar surface;
   adjusting the base structure along an axis perpendicular to a rotation plane of a threaded turning wheel by turning the threaded turning wheel;
   adjusting a tilt of the base structure around the horizontal axis that is substantially in the plane of the base structure and around a horizontal axis that is substantially out of the plane of the base structure by supporting the base structure on the tiltable planar surface and tilting it around a curved support structure;
   bringing a second base structure/holder structure pairs into a desired position;
   bringing a third base structure/holder structure pairs into a desired position.

9. The method according to claim 8, wherein the first base structure/holder structure pair is a central pair on a top row of the framework structure, wherein the second set of base structure/holder structure pairs are the remaining base structure/holder structure pairs on the top row of the framework structure and wherein the third set of base structure/holder structure pairs are the remaining base structure/holder structure pairs on the framework structure.

10. The method according to claim 8, wherein the base structure is folded along a vertical axis through its centre, and the method comprises configuring the base structure to be folded into an angle along said axis.

11. The method according to claim 10, comprising inserting a spacer into the folded base structure to support the angle.

12. The method according to claim 8, comprising a fixation system wherein the method comprises having the fixation system fixing the base structure and holder structure in a desired position relative each other.

13. The method according to claim 8, comprising mounting the base structures onto elongated members that join the base structures.

14. The method according to claim 8, comprising inserting means for blocking relative displacement along the tiltable planar surface into the interface system.

* * * * *